United States Patent
Umemoto et al.

(10) Patent No.: US 11,872,521 B2
(45) Date of Patent: Jan. 16, 2024

(54) AIR PURIFYING SYSTEM

(71) Applicant: KAWASAKI JUKOGYO KABUSHIKI KAISHA, Kobe (JP)

(72) Inventors: Katsuya Umemoto, Kobe (JP); Kazuhiro Okumura, Kobe (JP); Kouji Fukumoto, Kobe (JP); Tomoaki Umemura, Kobe (JP); Hideto Matsuyama, Kobe (JP); Eiji Kamio, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 189 days.

(21) Appl. No.: 17/427,506

(22) PCT Filed: Jan. 24, 2020

(86) PCT No.: PCT/JP2020/002544
§ 371 (c)(1),
(2) Date: Jul. 30, 2021

(87) PCT Pub. No.: WO2020/162228
PCT Pub. Date: Aug. 13, 2020

(65) Prior Publication Data
US 2022/0134275 A1    May 5, 2022

(30) Foreign Application Priority Data
Feb. 5, 2019    (JP) .................................. 2019-018828

(51) Int. Cl.
*B01D 53/22* (2006.01)
*B01D 63/02* (2006.01)
(Continued)

(52) U.S. Cl.
CPC .......... *B01D 53/228* (2013.01); *B01D 63/02* (2013.01); *F24F 8/60* (2021.01); *F24F 8/95* (2021.01);
(Continued)

(58) Field of Classification Search
None
See application file for complete search history.

(56) References Cited

U.S. PATENT DOCUMENTS 5,468,430 A * 11/1995 Ekiner .................... B01D 69/08
264/28
2010/0326121 A1* 12/2010 Ishida ................... B01D 53/228
62/407
(Continued)

FOREIGN PATENT DOCUMENTS

JP    2003-025991 A    1/2003
JP    2010-120496 A    6/2010
(Continued)

Primary Examiner — Jason M Greene
(74) Attorney, Agent, or Firm — Oliff PLC

(57) ABSTRACT

An air purifying system includes: a carbon dioxide remover including first and second spaces partitioned by a gas permeable membrane with 50 nm or less diameter micropores; a feed passage leading to-be-purified air from a room to the first space; a supply passage supplying clean gas having lower carbon dioxide and higher oxygen concentrations than the to-be-purified air to the second space; a discharge passage discharging, from the second space, mixed gas; a return passage leading purified air from the first space into the room, the purified air resulting from removing carbon dioxide from the to-be-purified air; and adjusting equipment adjusting a gas pressure in the first and second spaces to be substantially equal to each other. The to-be-purified air flows in the first space along a surface of the gas permeable (Continued)

membrane, and the clean gas flows in the second space along a surface of the gas permeable membrane.

15 Claims, 6 Drawing Sheets

(51) Int. Cl.
*F24F 8/60* (2021.01)
*F24F 8/95* (2021.01)

(52) U.S. Cl.
CPC ...... *B01D 2256/10* (2013.01); *B01D 2256/12* (2013.01); *B01D 2257/504* (2013.01); *B01D 2258/06* (2013.01); *B01D 2259/4508* (2013.01)

(56) References Cited

U.S. PATENT DOCUMENTS

| | | | |
|---|---|---|---|
| 2012/0000363 A1* | 1/2012 | Mizutani | B01D 53/22 96/9 |
| 2020/0086269 A1 | 3/2020 | Umemoto et al. | |
| 2020/0179867 A1* | 6/2020 | Koizumi | B01D 53/22 |
| 2020/0246749 A1 | 8/2020 | Umemoto et al. | |

FOREIGN PATENT DOCUMENTS

| | | |
|---|---|---|
| JP | 2011-161387 A | 8/2011 |
| JP | 2012-011880 A | 1/2012 |
| JP | 2018-185115 A | 11/2018 |
| JP | 2018-204946 A | 12/2018 |
| WO | 2018/199165 A1 | 11/2018 |

\* cited by examiner

AIR PURIFYING SYSTEM

CROSS-REFERENCE TO RELATED APPLICATIONS

The present application is a U.S. National Stage application of International Patent Application No. PCT/JP2020/002544, filed on Jan. 24 2020, which claims priority to Japanese Patent Application No. 2019-018828, filed on Feb. 5, 2019. The contents of these applications are incorporated herein by reference in their entirety.

TECHNICAL FIELD

The present disclosure relates to an air purifying system for purifying the air in a room.

BACKGROUND ART

In a room in which people carry out activities, the oxygen concentration decreases and the carbon dioxide concentration increases due to each person's breathing. The room is usually ventilated to suppress such decrease and increase in the oxygen and carbon dioxide concentrations and thereby to satisfy the indoor environment standards. In some cases, the room is equipped with an air conditioner for performing air conditioning such as heating and/or cooling to keep the room comfortable.

In a building with low air tightness, such as an ordinary house, indoor air and outdoor air are exchanged naturally, and thereby ventilation occurs. On the other hand, in a building with high air tightness, such as an office building, it is necessary to forcibly exchange the indoor air with the outdoor air by a ventilator.

When the ventilation is performed, the air that is newly taken into the room needs to be conditioned. As a result, the air-conditioning load increases. In this respect, in recent years, in order to reduce the air-conditioning load, it has been proposed to selectively remove carbon dioxide from the air in a room to purify the air, thereby reducing the ventilation amount.

For example, Patent Literature 1 discloses an air purifying system in which a circulation passage that circulates the air in a room is provided with a carbon dioxide remover. The carbon dioxide remover includes a separation membrane that selectively allows carbon dioxide to permeate therethrough (hereinafter, simply referred to as "the separation membrane"). Also, in order to make a gas pressure difference between the circulation passage side of the separation membrane (i.e., one of the spaces that are partitioned from each other by the separation membrane) and the permeation side of the separation membrane (i.e., the other one of the spaces that are partitioned from each other by the separation membrane), a decompression pump for drawing a vacuum on the permeation side of the separation membrane is connected to the carbon dioxide remover.

CITATION LIST

Patent Literature

PTL 1: Japanese Laid-Open Patent Application Publication No. 2003-25991

SUMMARY OF INVENTION

Technical Problem

In order to improve the air purifying efficiency of the above-described conventional system, the separation membrane is required to have high carbon dioxide selectivity so that the permeation of gas components other than carbon dioxide through the separation membrane will be minimized. However, conventionally known separation membranes having high carbon dioxide selectivity have a low carbon dioxide permeation rate, and are required to have a large membrane surface area so as to realize a predetermined carbon dioxide removal amount. This may cause increase in the size of the system apparatus as well as increase in cost.

In view of the above, an object of the present disclosure is to realize an air purifying system capable of efficiently purifying the air in a room while reducing the air-conditioning load and preventing an increase in the size of the system apparatus.

Solution to Problem

In order to solve the above-described problems, an air purifying system according to one aspect of the present disclosure includes: a carbon dioxide remover including a first space and a second space that are partitioned from each other by at least one gas permeable membrane that includes micropores whose diameter is 50 nm or less; a feed passage that leads to-be-purified air from inside of a room to the first space; a supply passage that supplies clean gas that has a lower carbon dioxide concentration and a higher oxygen concentration than the to-be-purified air to the second space; a discharge passage that discharges, from the second space, mixed gas that is a mixture of the clean gas and carbon dioxide that has permeated through the gas permeable membrane from the first space; a return passage that leads purified air from the first space into the room, the purified air resulting from removing carbon dioxide from the to-be-purified air; and adjusting equipment that adjusts a gas pressure in the first space and a gas pressure in the second space to be substantially equal to each other. The to-be-purified air flows in the first space along a surface of the gas permeable membrane, and the clean gas flows in the second space along a surface of the gas permeable membrane.

According to the above configuration, a necessary amount of clean gas for removing a predetermined amount of carbon dioxide from the air in the room is supplied to the second space of the carbon dioxide remover, and in a state where the gas pressure in the first space and the gas pressure in the second space are adjusted to be substantially equal to each other by the adjusting equipment, carbon dioxide can be moved from the first space to the second space, and oxygen can be moved from the second space to the first space, through the micropores of the gas permeable membrane by utilizing the carbon dioxide partial pressure difference and the oxygen partial pressure difference between the to-be-purified air in the first space and the clean gas in the second space. In this manner, carbon dioxide can be removed from the to-be-purified air, and also, oxygen can be supplied to the to-be-purified air.

Since the gas pressure in the first space and the gas pressure in the second space are adjusted to be substantially equal to each other, the mixing of the gas of the first space and the gas of the second space with each other can be significantly suppressed. This makes it possible to prevent the amount of heat in the to-be-purified air and the amount of heat in the clean gas from being equalized to each other due to the mixing thereof with each other. Consequently, the air-conditioning load in the room after the purified air is returned from the carbon dioxide remover into the room can be reduced.

The carbon dioxide remover may include at least one membrane module, the membrane module including the first space, the second space, and the gas permeable membrane. The membrane module may include: a first introduction port, through which the to-be-purified air is introduced into the first space; a first discharge port, through which the purified air is discharged from the first space; a second introduction port, through which the clean gas is introduced into the second space; and a second discharge port, through which the mixed gas is discharged from the second space. The adjusting equipment may include: at least one first-space-dedicated adjuster that adjusts a flow rate and a gas pressure in a passage in the membrane module, the passage connecting between the first introduction port and the first discharge port, and at least one second-space-dedicated adjuster that adjusts a flow rate and a gas pressure in a passage in the membrane module, the passage connecting between the second introduction port and the second discharge port.

According to the above configuration, by adjusting the first-space-dedicated adjuster and the second-space-dedicated adjuster, the gas pressure in the first space and the gas pressure in the second space in the membrane module can be readily adjusted to be substantially equal to each other.

Each of the first-space-dedicated adjuster and the second-space-dedicated adjuster may be a valve. Accordingly, by adjusting the opening degree of each valve individually, the flow rate and the gas pressure in the passage connecting between the first introduction port and the first discharge port in the membrane module, and the flow rate and the gas pressure in the passage connecting between the second introduction port and the second discharge port in the membrane module, can be finely adjusted. In addition, gas pressure fluctuations in these passages can be readily suppressed.

The adjusting equipment may include a controller that controls the first-space-dedicated adjuster and the second-space-dedicated adjuster individually. This makes it possible to finely and promptly adjust the first-space-dedicated adjuster and the second-space-dedicated adjuster.

The first-space-dedicated adjuster may adjust the gas pressure in the first space to be substantially equal to the gas pressure in the second space while securing a necessary supply amount of the to-be-purified air for removing a predetermined amount of carbon dioxide from the to-be-purified air.

According to the above configuration, the supply amount of the to-be-purified air to the carbon dioxide remover can be properly set by the first-space-dedicated adjuster, and carbon dioxide can be efficiently removed from the to-be-purified air by using the gas permeable membrane.

The at least one membrane module may include membrane modules. The air purifying system may further include: first supply piping that connects the first introduction ports of the respective membrane modules to each other and that supplies the to-be-purified air to the first introduction ports collectively; and second supply piping that connects the second introduction ports of the respective membrane modules to each other and that supplies the clean gas to the second introduction ports collectively. The adjusting equipment may further include: a first flow rate adjuster that adjusts a flow rate of the first supply piping; and a second flow rate adjuster that adjusts a flow rate of the second supply piping.

According to the above configuration, for example, in a state where the gas pressure in the first space and the gas pressure in the second space in each membrane module are adjusted to be substantially equal to each other by the first-space-dedicated valve and the second-space-dedicated valve, the flow rate of the first supply piping is adjusted by the first flow rate adjuster, and the flow rate of the second supply piping is adjusted by the second flow rate adjuster. This makes it possible to adjust the flow rate of the to-be-purified air and the flow rate of the clean gas that are introduced into each membrane module, while maintaining the gas pressure in the first space and the gas pressure in the second space in each membrane module. Therefore, labor hours to adjust the gas pressure in the first space and the gas pressure in the second space in each membrane module in accordance with changes made to the flow rates can be eliminated, and the air purifying system can be operated much more easily.

The gas permeable membrane may be an ultrafiltration membrane. By thus using, as the gas permeable membrane, an ultrafiltration membrane that is normally used for water treatment, the diameter of the micropores can be set to 10 nm or less. Such setting prevents various extraneous matter including not only viruses, bacteria, and fungi, but also cedar pollen and cypress pollen from passing through the gas permeable membrane, and thereby these extraneous matter can be prevented from being mixed into the purified air, which is returned into the room.

The gas permeable membrane may be a hollow fiber membrane. The first space may be disposed inside a hollow fiber included in the hollow fiber membrane. The second space may be disposed outside the hollow fiber. This makes it possible to secure a large membrane surface area of the gas permeable membrane, more readily prevent an increase in the system apparatus size, and further improve the efficiency of the air purification by the gas permeable membrane.

The air purifying system may further include an air feeder that is provided on a non-end portion of the feed passage. This makes it possible to readily adjust the gas pressure in the feed passage by using the air feeder.

The at least one gas permeable membrane included in the carbon dioxide remover includes sheet-shaped gas permeable membranes. The gas permeable membranes may be arranged at intervals in a thickness direction of the gas permeable membranes. The first space may be disposed between each one of the gas permeable membranes and another one of the gas permeable membranes adjacent thereto on one side in the thickness direction. The second space may be disposed between each one of the gas permeable membranes and another one of the gas permeable membranes adjacent thereto on the other side in the thickness direction.

According to the above configuration, by arranging the sheet-shaped gas permeable membranes such that they are laminated at intervals, the membrane surface area of the gas permeable membranes can be increased while suppressing an increase in the size of the carbon dioxide remover. This makes it possible to more readily prevent an increase in the size of the system apparatus, and improve the efficiency of the purification of the to-be-purified air by the gas permeable membranes.

Advantageous Effects of Invention

The present disclosure makes it possible to realize an air purifying system capable of efficiently purifying the air in a room while reducing the air-conditioner load and preventing an increase in the size of the system apparatus.

DESCRIPTION OF EMBODIMENTS

Hereinafter, embodiments are described with reference to the drawings.

Embodiment 1

Figure 1:
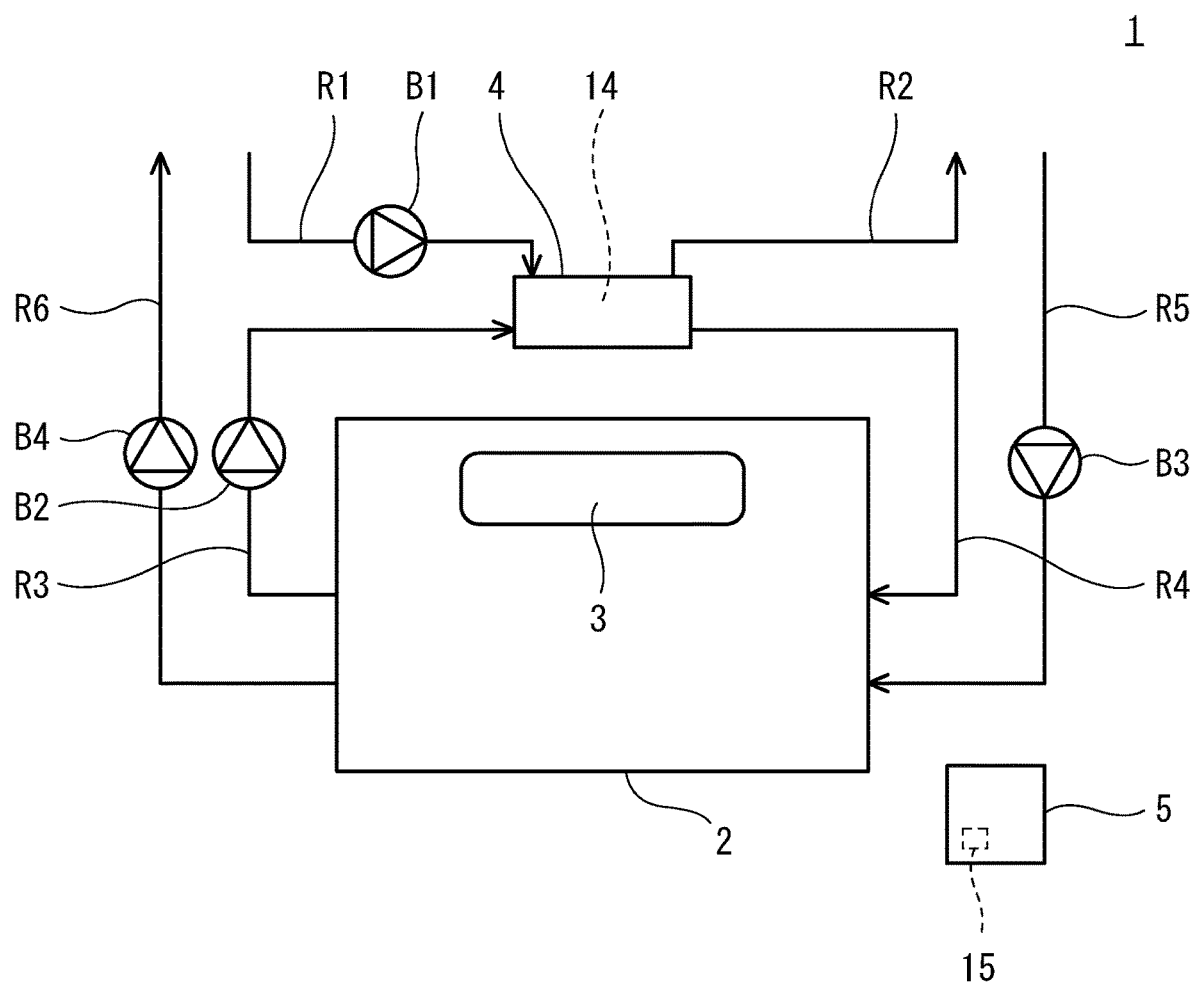
FIG. 1 shows a schematic configuration of an air purifying system according to Embodiment 1 of the present disclosure.

FIG. 1 shows a schematic configuration of an air purifying system 1 according to Embodiment 1 of the present disclosure. The air purifying system 1 shown in FIG. 1 purifies air in a room 2 accommodating a person. In the description herein, the room 2 is a person's residential space or any other space equivalent thereto. The room 2 is a space that needs air conditioning. For example, the room 2 may be a room in a building, such as an office building. Alternatively, the room 2 may be a room provided in a transportation system such as a railcar or an aircraft (i.e., a cabin).

The room 2 may be a room provided in, for example, a space station, a submersible ship, or a disaster refuge facility. The room 2 may be, for example, a room that is not accessed by humans and in which animals and/or plants are managed and the carbon dioxide concentration is controlled and kept to a certain level or lower.

As shown in FIG. 1, the air purifying system 1 includes an air conditioner 3, a carbon dioxide remover 4 (hereinafter, simply referred to as "the remover 4"), adjusting equipment 5, a supply passage R1, a discharge passage R2, a feed passage R3, a return passage R4, a first ventilation passage R5, a second ventilation passage R6, and air feeders B1 to B4.

The air conditioner 3 conditions the air in the room 2. The exhaust technique adopted by the remover 4 is sweep exhaust. The remover 4 removes carbon dioxide in the room 2. In the illustrated example, the remover 4 is disposed outside the room 2. The remover 4 may be disposed inside the room 2. The adjusting equipment 5 adjusts a gas pressure in a first space S1 and a gas pressure in a second space S2 of the remover 4 (which will be described below) while being supplied with a necessary amount of air for achieving a predetermined amount of carbon dioxide removal.

The downstream end of the supply passage R1 is connected to the remover 4. The supply passage R1 supplies clean gas (which may hereinafter be referred to as "sweep gas") that has a lower carbon dioxide concentration and a higher oxygen concentration than the air in the room 2 (which may hereinafter be referred to as "to-be-purified air") to the second space S2 of the remover 4. Non-limiting examples of the sweep gas include outdoor air as well as air that has been separately conditioned and purified in the building. The upstream end of the discharge passage R2 is connected to the remover 4. The discharge passage R2 discharges, from the second space S2, mixed gas that is a mixture of the sweep gas and carbon dioxide that has permeated through a gas permeable membrane 41a (see FIG. 2) from the first space S1 of the remover 4.

The upstream end of the feed passage R3 is connected to the room 2, and the downstream end of the feed passage R3 is connected to the remover 4. The feed passage R3 leads the to-be-purified air (which may hereinafter be referred to as "feed gas") from the inside of the room 2 to the first space S1 of the remover 4.

The upstream end of the return passage R4 is connected to the remover 4, and the downstream end of the return passage R4 is connected to the room 2. The return passage R4 leads purified air from the first space S1 of the remover 4 into the room 2. The purified air results from removing carbon dioxide from the feed gas.

The downstream end of the first ventilation passage R5 is connected to the room 2. The first ventilation passage R5 supplies ventilation air from the outside into the room 2. The upstream end of the second ventilation passage R6 is connected to the room 2. The second ventilation passage R6 discharges the air in the room 2 from the room 2 to the outside. The air feeders B1 to B4 are each provided on a non-end portion of a corresponding one of the passages R1, R3, R5, and R6.

The air purifying system 1 is provided with the carbon dioxide remover. Therefore, compared to a case where the air purifying system 1 is not provided with the carbon dioxide remover, the cross-sectional area of each of the first ventilation passage R5 and the second ventilation passage R6 can be reduced, and also, the capacity of each of the air feeders B3 and B4 can be reduced.

Figure 2:
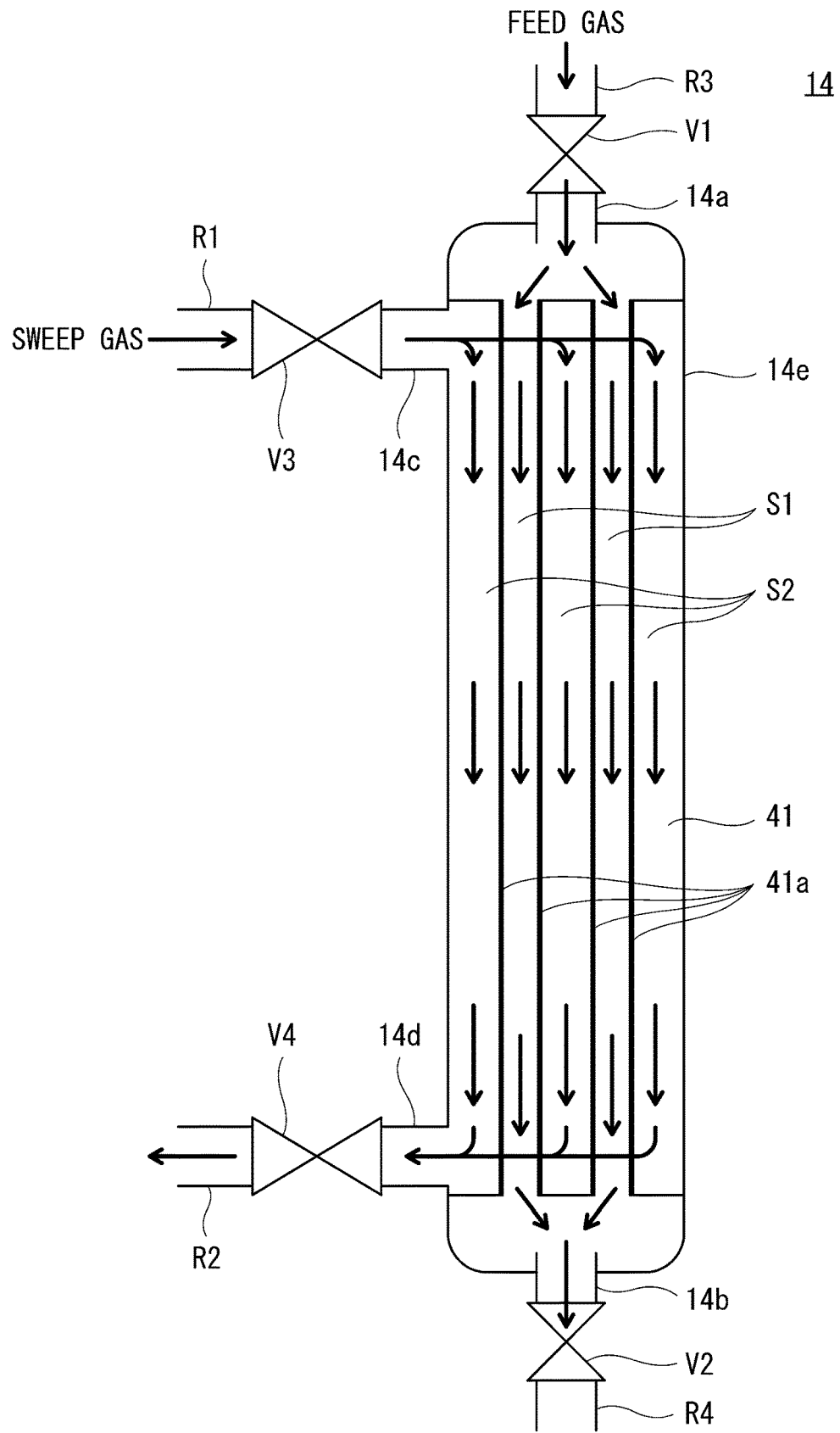
FIG. 2 is a sectional view of a membrane module included in a carbon dioxide remover of FIG. 1.
Figure 3:
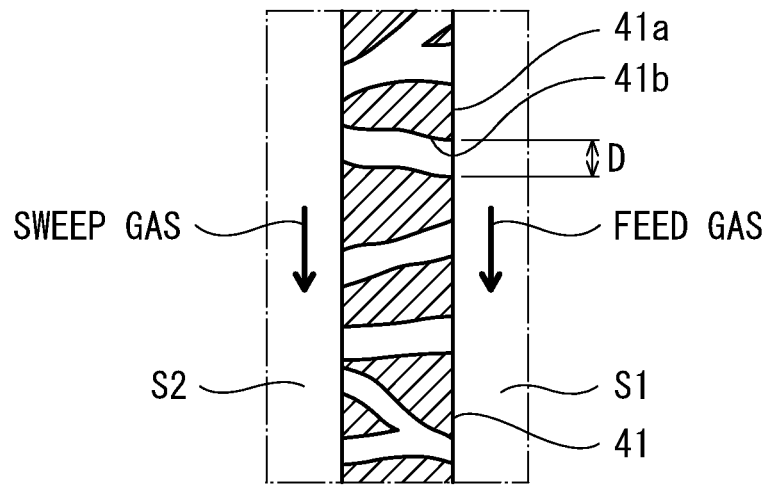
FIG. 3 is an enlarged sectional view of a gas permeable membrane of FIG. 2.

FIG. 2 is a sectional view of a membrane module 14 included in the remover 4 of FIG. 1. FIG. 3 is an enlarged sectional view of the gas permeable membrane 42 of FIG. 2.

As shown in FIGS. 2 and 3, the remover 4 includes the first and second spaces S1 and S2, which are partitioned from each other by at least one gas permeable membrane 41a, which includes micropores 41b whose diameter is 50 nm or less. The gas permeable membrane 41a allows carbon dioxide to permeate therethrough from the first space S1 to the second space S2 and allows oxygen to permeate therethrough from the second space S2 to the first space S1 in accordance with a carbon dioxide partial pressure difference and an oxygen partial pressure difference between the first space S1 and the second space S2. The gas permeable membrane 41a also allows other gas components, such as nitrogen, to permeate therethrough in accordance with a partial pressure difference between the first space S1 and the second space S2. However, generally speaking, the partial pressure difference of the other gas components between the first space S1 and the second space S2 is small. Therefore, the amount of the other gas components moving between the first space S1 and the second space S2 is a minute amount.

The remover 4 of the present embodiment includes at least one membrane module 14 (in this example, membrane modules 14) each including the first space S1, the second space S2, and the gas permeable membrane 41a. The membrane module 14 includes: a first introduction port 14a, through which the feed gas is introduced into the first space S1; a first discharge port 14b, through which the purified air is discharged from the first space S1; a second introduction port 14c, through which the sweep gas is introduced into the second space S2; and a second discharge port 14d, through which the mixed gas is discharged from the second space S2.

Specifically, the membrane module 14 includes an elongated hollow structure 14e and hollow fibers 41. The hollow fibers 41 are accommodated inside the hollow structure 14e, and extend in the longitudinal direction of the hollow structure 14e. The external diameter of each hollow fiber 41 can be suitably set, for example, to several mm (in this example, 2 mm).

The number of hollow fibers 41 included in each membrane module 14 can be suitably set, for example, within a range from several tens of hollow fibers 41 to several thousands of hollow fibers 41. In FIG. 2, the hollow fibers 41 are drawn as thick fibers for the sake of convenience of the description.

One end of the hollow structure 14e in the longitudinal direction thereof is provided with the first introduction port 14a, and the other end of the hollow structure 14e in the longitudinal direction thereof is provided with the first discharge port 14b. A side surface of the hollow structure 14e in the vicinity of the first introduction port 14a is provided with the second introduction port 14c, and a side surface of the hollow structure 14e in the vicinity of the first discharge port 14b is provided with the second discharge port 14d. The feed gas introduced through the first introduction port 14a flows from the one end to the other end of the hollow structure 14e in the longitudinal direction thereof. While flowing from the one end to the other end of the hollow structure 14e, the feed gas is purified, and the resulting purified air is discharged from the hollow structure 14e through the first discharge port 14b.

The side surface of each hollow fiber 41 of the present embodiment is the gas permeable membrane 41a. That is, in the present embodiment, the gas permeable membrane 41a is a hollow fiber membrane. Such gas permeable membrane may be an ultrafiltration membrane (UF membrane) for use in water treatment application. The gas permeable membrane 41a of the present embodiment is an ultrafiltration membrane.

The first space S1 is disposed inside each hollow fiber 41 of the hollow fiber membrane, and the second space S2 is disposed outside the hollow fiber 41. The second introduction port 14c is connected to one end of the hollow fibers 41 in the longitudinal direction thereof, and the second discharge port 14d is connected to the other end of the hollow fibers 41 in the longitudinal direction thereof. The sweep gas introduced through the second introduction port 14c flows through the inside of the hollow fibers 41 from the one end toward the other end of the hollow fibers 41 in the longitudinal direction thereof, and turns into the mixed gas, which is discharged from the hollow fibers 41 through the second discharge port 14d.

The gas permeable membrane 41a includes the micropores 41b, whose diameter is 50 nm or less. The micropores 41b are dispersedly arranged along the surface of the gas permeable membrane 41a, and penetrate the gas permeable membrane 41a in the thickness direction. The micropores 41b herein are holes, each of which allows a pair of or multiple openings formed on one and the other surfaces of the gas permeable membrane 41a to communicate with each other.

The diameter D of the micropores 41b is set such that at the time of driving the air purifying system 1, among the gas molecules contained in the feed gas and the sweep gas, carbon dioxide molecules and oxygen molecules can be selectively moved within the micropores 41b by utilizing a diffusion phenomenon based on Brownian motion.

The diameter D can be suitably set within the range of less than or equal to 50 nm. For example, the diameter D is desirably 40 nm or less, more desirably 25 nm or less, and yet more desirably 10 nm or less. If the diameter D is greater than 50 nm, mixing of the air in the first space S1 and the air in the second space S2 is facilitated, and thereby exchange of enthalpy therebetween progresses. For this reason, the diameter D being greater than 50 nm is unfavorable.

The inner and outer surfaces of the gas permeable membrane 41a, except the regions provided with the micropores 41b, have such flatness that when gas flows along the inner and outer surfaces of the gas permeable membrane 41a, the gas does not swirl. The thickness of the gas permeable membrane 41a can be suitably set, for example, to a value within a range of not less than several tens of μm, but not greater than several hundreds of μm (in this example, set to 400 μm).

In this example, the gas permeable membrane 41a is an organic membrane. Alternatively, the gas permeable membrane 41a may be an inorganic membrane. In a case where the gas permeable membrane 41a is an organic membrane, examples of the material of the gas permeable membrane 41a include cellulose diacetate and triacetate (CA, CTA), cellulose nitrate (CN), cellulose, polyacrylonitrile (PAN), polyamide (aromatic and aliphatic), polysulfone (PS), polyether sulfone (PES), polycarbonate, polyethylene terephthalate (PET), polyimide (PI), polyethylene (PE), polypropylene (PP), polytetrafluoroethylene (PTFE) (Teflon (registered trademark)), polyvinylidene fluoride (PVDF), polyvinylchloride (PVC), and polyvinyl alcohol (PVA). In a case where the gas permeable membrane 41a is an inorganic membrane, examples of the material of the gas permeable membrane 41a include aluminum oxide ($Al_2O_3$), zirconium oxide ($ZrO_2$), titanium oxide ($TiO_2$), and silica oxide ($SiO_2$). The gas permeable membrane 41a may be a membrane that is not a hollow fiber membrane.

The adjusting equipment 5 adjusts the gas pressure in the first space S1 and the gas pressure in the second space S2 to be substantially equal to each other. The adjusting equipment 5 includes at least one first-space-dedicated adjuster, at least one second-space-dedicated adjuster, and a controller 15. In the present embodiment, each of the first-space-dedicated adjuster and the second-space-dedicated adjuster is a valve. Hereinafter, the first-space-dedicated adjuster and the second-space-dedicated adjuster are referred to as "the first-space-dedicated valve" and "the second-space-dedicated valve", respectively.

The first-space-dedicated valve adjusts the flow rate and gas pressure in a passage that connects between the first introduction port 14a and the first discharge port 14b of the membrane module 14. The first-space-dedicated valve adjusts the gas pressure in the first space S1 to be substantially equal to the gas pressure in the second space S2 while securing a necessary supply amount of the feed gas for removing a predetermined amount of carbon dioxide from the feed gas.

The adjusters are not limited to valves, so long as the adjusters can adjust the gas pressures to be substantially equal to each other. For example, in a case where the flow rate into the first space S1 and the flow rate into the second space S2 are always constant, or in a case where the flow rates are controlled by inverter circuits of the air feeders, valves such as orifices with constant pressure losses may be used as the adjusters. In such a case, even without the controller 15, the gas pressures are adjusted by utilizing the preset pressure losses. Therefore, in this case, individual control is not required.

The present embodiment includes valves V1 and V2, each of which is the first-space-dedicated valve. By suitably adjusting the valves V1 and V2, the gas pressure in the first space S1 can be adjusted to be substantially equal to the gas pressure in the second space S2 while securing the necessary supply amount of the feed gas for removing the predetermined amount of carbon dioxide from the feed gas.

Even when the valves V1 and V2 are adjusted, if the feed gas supply amount to the remover 4 is insufficient, for example, the air feeder B2 is driven to increase the supply pressure of the feed gas to the remover 4, and thereby the feed gas supply amount to the remover 4 can be increased. In this case, with the pressure of the feed gas being increased by the air feeder B2, the flow rate and the gas pressure are both adjusted by the valves V1 and V2.

The second-space-dedicated valve adjusts the flow rate and gas pressure in a passage that connects between the second introduction port 14c and the second discharge port 14d of the membrane module 14. The second-space-dedicated valve adjusts the gas pressure in the second space S2 to be substantially equal to the gas pressure in the first space S1 while securing a necessary supply amount of the sweep gas for removing the predetermined amount of carbon dioxide from the feed gas.

The present embodiment includes valves V3 and V4, each of which is the second-space-dedicated valve. By suitably adjusting the valves V3 and V4, the gas pressure in the second space S2 can be adjusted to be substantially equal to the gas pressure in the first space S1 while securing the necessary supply amount of the sweep gas for removing the predetermined amount of carbon dioxide from the feed gas.

Even when the valves V3 and V4 are adjusted, if the sweep gas supply amount to the remover 4 is insufficient, for example, the air feeder B1 is driven to increase the supply pressure of the sweep gas to the remover 4, and thereby the sweep gas supply amount to the remover 4 can be increased. In this case, with the pressure of the sweep gas being increased by the air feeder B1, the flow rate and the gas pressure are both adjusted by the valves V3 and V4. In the case of driving the air feeders B1 and B2, variable rotation speed control of the air feeders B1 and B2 is performed by varying the frequencies by inverter circuits, and thereby energy saving is achieved.

The controller 15 controls the first-space-dedicated valve(s) and the second-space-dedicated valve(s) individually. The controller 15 of the present embodiment controls the valves V1 to V4 individually. As one example, the valves V1 to V4 are back pressure valves. The controller 15 controls the valves V1 to V4 individually, such that an average gas pressure P1 in the first space S1 (in this example, the average of the gas pressure at the first introduction port 14a and the gas pressure at the first discharge port 14b) and an average gas pressure P2 in the second space S2 (in this example, the average of the gas pressure at the second introduction port 14c and the gas pressure at the second discharge port 14d) are substantially equal to each other.

In a case where variable rotation speed control of the air feeder B2 is performable, only one of the valves V1 and V2 may be the first-space-dedicated valve. Similarly, in a case where variable rotation speed control of the air feeder B1 is performable, only one of the valves V3 and V4 may be the second-space-dedicated valve. In such a case, only the valve V2 may be used as the first-space-dedicated valve, and only the valve V4 may be used as the second-space-dedicated valve. The adjusting equipment 5 of the present embodiment controls the air feeders B1 to B4 individually.

At the time of driving the air purifying system 1, since the air feeder B1 is driven, the sweep gas from the outside flows through the supply passage R1 to be introduced into the remover 4, in which the sweep gas turns into the state of containing carbon dioxide in the room 2, and then the gas flows from the remover 4 through the discharge passage R2 to be discharged as the mixed gas. Also, since the air feeder B2 is driven, the feed gas from the inside of the room 2 flows through the feed passage R3 to be introduced into the remover 4, in which carbon dioxide is removed from the feed gas and oxygen is supplied to the feed gas. In this manner, purified air is generated in the remover 4, and the generated purified air flows through the return passage R4 to return into the room 2. As a result of driving the air purifying system 1, the carbon dioxide concentration in the room 2 is adjusted to 1,000 ppm or lower, which meets the indoor environment standards.

Since the air purifying system 1 is provided with the remover 4, compared to a case where the air purifying system 1 is not provided with the remover 4, the cross-sectional area of each of the first ventilation passage R5 and the second ventilation passage R6 can be reduced, and also, the capacity of each of the air feeders B3 and B4 can be reduced.

The air feeder B3 is driven as necessary. As a result, first ventilation air flows through the first ventilation passage R5 to be introduced into the room 2. Also, the air feeder B4 is driven as necessary. As a result, the air in the room 2 flows through the second ventilation passage R6, and is discharged.

In the air purifying system 1, the adjusting equipment 5 adjusts the gas pressure in the first space S1 and the gas pressure in the second space S2 to be substantially equal to each other. The state of the gas pressures being "substantially equal to each other" herein means, for example, that a gas pressure difference between the average gas pressures P1 and P2 is set to a value of 1.0 kPa or less. In this state, the feed gas flows in the first space S1 along the surface of the gas permeable membrane 41a, and the sweep gas flows in the second space S2 along the surface of the gas permeable membrane 41a.

By thus setting the gas pressure difference to a value of 1.0 kPa or less, a phenomenon in which the feed gas and the sweep gas are directly mixed with each other through the micropores 41b of the gas permeable membrane 41a is prevented properly.

At the time, the sweep gas that flows along one surface of the gas permeable membrane 41a has a lower carbon dioxide partial pressure and a higher oxygen partial pressure than the feed gas that flows along the other surface of the gas permeable membrane 41a. Regarding the other gas components, for example, about nitrogen, the nitrogen partial pressure of the sweep gas and the nitrogen partial pressure of the feed gas are substantially equal to each other. Accordingly, due to the micropores 41b formed in the gas permeable membrane 41a, carbon dioxide moves from the feed gas to the sweep gas, and oxygen moves from the sweep gas to the feed gas. Meanwhile, almost no other gas components, including nitrogen, move between the sweep gas and the feed gas.

Consequently, in a state where the gas pressure in the first space S1 and the gas pressure in the second space S2 are adjusted to be substantially equal to each other, due to the carbon dioxide partial pressure difference between the feed gas and the sweep gas, which flow on one surface side and on the other surface side of the gas permeable membrane 41a, respectively, carbon dioxide molecules in the feed gas move into the sweep gas through the micropores 41b. Also, due to the oxygen partial pressure difference between the feed gas and the sweep gas, oxygen molecules in the sweep gas move into the feed gas through the micropores 41b. Within the micropores 41b, carbon dioxide molecules and oxygen molecules move due to the diffusion phenomenon based on Brownian motion.

While the carbon dioxide molecules and the oxygen molecules are moving, since the gas pressure in the first space S1 and the gas pressure in the second space S2 are substantially equal to each other, other components than the carbon dioxide molecules and the oxygen molecules are prevented from being mixed with each other through the micropores 41b. Therefore, only the carbon dioxide concentration and the oxygen concentration in the feed gas can be adjusted by the gas permeable membrane 41a, and purified air can be obtained from the feed gas supplied to the remover 4.

For example, in the case of a commonly used gas separation membrane, a static pressure difference is made between the space on one surface side of the gas permeable membrane and the space on the other surface side of the gas permeable membrane, and thereby gas is caused to flow perpendicularly to the membrane surface of the gas permeable membrane. Consequently, extraneous matter in the gas is filtered, and the gas molecules are separated. On the other hand, the gas permeable membrane 41a is used in such a manner that the gases are caused to flow along the respective surfaces of the gas permeable membrane 41a while adjusting the gas pressure in the space on one surface side of the membrane 41a and the gas pressure in the space on the other surface side of the membrane 41a to be substantially equal to each other. In this point, the membrane 41a is significantly different from the commonly used gas separation membrane.

Moreover, in the case of the gas permeable membrane 41a, even if extraneous matter is mixed in the feed gas and the sweep gas, since these fluids are caused to flow along the respective surfaces of the gas permeable membrane 41a, clogging in the gas permeable membrane 41a due to the extraneous matter does not easily occur. For this reason, the gas permeable membrane 41a can be used for a long period of time.

Figure 4:
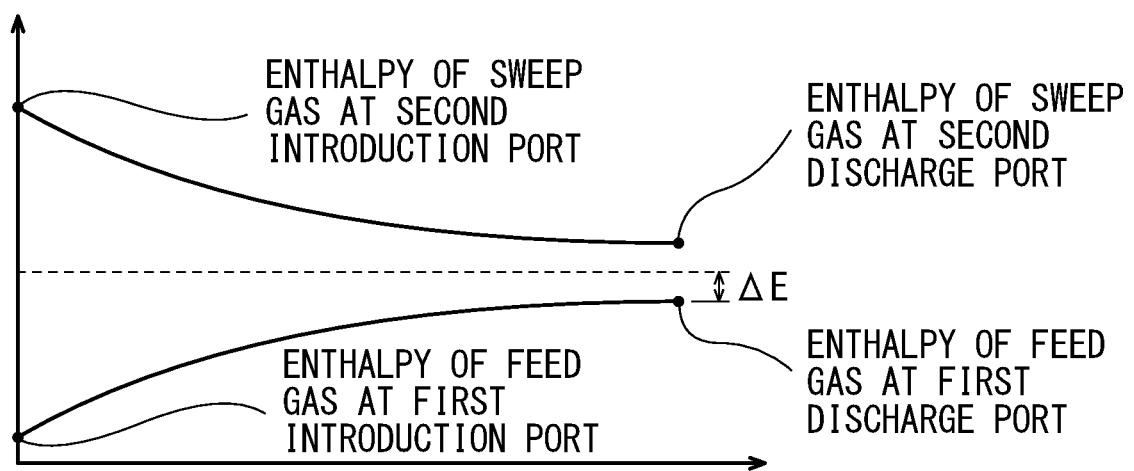
FIG. 4 is a graph showing changes in the enthalpy of feed gas and sweep gas in the carbon dioxide remover of FIG. 1.

FIG. 4 is a graph showing changes in the enthalpy of the feed gas and the sweep gas in the remover 4 of FIG. 1. A dashed line extending in the direction of the horizontal axis of the graph represents a mixed enthalpy in a case where the feed gas and the sweep gas are fully mixed together. As shown in FIG. 4, in the air purifying system 1, since the feed gas and the sweep gas are suppressed from being directly mixed with each other, even when the feed gas and the sweep gas are caused to flow inside the remover 4, the amount of heat in the feed gas and the amount of heat in the sweep gas can be individually maintained to some extent.

By preventing the feed gas from being mixed with the sweep gas, the enthalpy of the feed gas and the enthalpy of the sweep gas can be prevented from being equalized to each other, and the enthalpy difference ΔE of the feed gas from the sweep gas can be maintained to some extent at the feed gas outlet (the first discharge port 14b) side of the remover 4. Consequently, the amount of heat in the air in the room 2 can be maintained, which makes it possible to reduce the air-conditioning load of the air conditioner 3 and reduce electric power consumption by the air conditioning of the air conditioner 3.

As described above, according to the air purifying system 1, a necessary amount of sweep gas for removing a predetermined amount of carbon dioxide from the feed gas is supplied to the second space S2 of the remover 4, and in a state where the gas pressure in the first space S1 and the gas pressure in the second space S2 are adjusted to be substantially equal to each other by the adjusting equipment 5, carbon dioxide molecules can be moved from the first space S1 to the second space S2, and oxygen can be moved from the second space S2 to the first space S1, through the micropores 41b of the gas permeable membrane 41a by utilizing the carbon dioxide partial pressure difference and the oxygen partial pressure difference between the feed gas in the first space S1 and the sweep gas in the second space S2. In this manner, carbon dioxide can be removed from the air in the room 2, and also, oxygen can be supplied to the air in the room 2.

Since the gas pressure in the first space S1 and the gas pressure in the second space S2 are adjusted to be substantially equal to each other, the mixing of the gas of the first space S1 and the gas of the second space S2 with each other can be significantly suppressed. This makes it possible to prevent the amount of heat in the feed gas and the amount of heat in the sweep gas from being equalized to each other due to the mixing thereof with each other. Consequently, the air-conditioning load in the room 2 after the purified air is returned from the remover 4 into the room 2 can be reduced.

In the air purifying system 1 of the present embodiment, for the other gas components such as nitrogen, the partial pressure difference between the sweep gas and the feed gas is a minute difference. Therefore, the other gas components do not move between the sweep gas and the feed gas.

Further, in the present embodiment, the gas permeable membrane 41a, which partitions the first space S1 and the second space S2 from each other in the remover 4, exerts a certain level of thermal conduction suppressing effect. This makes it possible to further prevent the amount of heat in the feed gas and the amount of heat in the sweep gas from being equalized to each other due to the mixing thereof with each other, and thereby the air-conditioning load in the room 2 can be reduced more favorably. Moreover, by using the outdoor air as the sweep gas, the cost for the sweep gas can be reduced significantly.

In the present embodiment, the first-space-dedicated adjuster and the second-space-dedicated adjuster are valves. Accordingly, by adjusting the opening degree of each valve individually, the flow rate and the gas pressure in the passage connecting between the first introduction port 14a and the first discharge port 14b in the membrane module 14, and the flow rate and the gas pressure in the passage connecting between the second introduction port 14c and the second discharge port 14d in the membrane module 14, can be finely adjusted. In addition, gas pressure fluctuations in these passages can be readily suppressed.

The adjusting equipment 5 of the present embodiment includes the controller 15, which controls the first-space-dedicated adjuster and the second-space-dedicated adjuster individually. This makes it possible to finely and promptly adjust the first-space-dedicated adjuster and the second-space-dedicated adjuster.

The air purifying system 1 of the present embodiment includes the air feeder B2, which is provided on a non-end portion of the feed passage R3. This makes it possible to readily adjust the gas pressure in the feed passage R3 by using the air feeder B2.

The first-space-dedicated adjuster of the present embodiment adjusts the gas pressure in the first space S1 to be substantially equal to the gas pressure in the second space S2 while securing a necessary supply amount of the feed gas for removing a predetermined amount of carbon dioxide from the feed gas.

According to this configuration, the supply amount of the feed gas to the remover 4 can be properly set by the first-space-dedicated adjuster, and carbon dioxide can be efficiently removed from the feed gas by using the gas permeable membrane 41a.

The gas permeable membrane 41a of the present embodiment is an ultrafiltration membrane. By thus using, as the gas permeable membrane 41a, an ultrafiltration membrane that is normally used for water treatment, the diameter of the micropores 41b can be set to 10 nm or less. Such setting prevents various extraneous matter including not only viruses, bacteria, and fungi, but also cedar pollen and cypress pollen from passing through the gas permeable membrane, and thereby these extraneous matter can be prevented from being mixed into the purified air, which is returned into the room.

Assume a case where an ultrafiltration membrane (UF) for use in water treatment, the ultrafiltration membrane (UF) having an average pore diameter of 4 nm, is used as the gas permeable membrane. In this case, the carbon dioxide permeation rate of the gas permeable membrane is 10 to 30 times that of a conventionally known carbon dioxide selective separation membrane. This makes it possible to efficiently purify the air in the room 2 while achieving significant reduction in the size and cost of the air purifying system. In addition, equipment such as a decompression pump can be eliminated advantageously.

In the air purifying system 1 of the present embodiment, by controlling the first-space-dedicated adjuster and the second-space-dedicated adjuster by the controller 15 individually, a necessary air supply amount for achieving a predetermined carbon dioxide removal amount can be obtained, and in addition, the gas pressure in the first space S1 and the gas pressure in the second space S2 can be readily adjusted to be substantially equal to each other.

The gas permeable membrane 41a is a hollow fiber membrane. The first space S1 is disposed inside the hollow fiber 41, and the second space S2 is disposed outside the hollow fiber 41. This makes it possible to secure a large membrane surface area of the gas permeable membrane 41a, more readily prevent an increase in the size of the air purifying system 1, and further improve the efficiency of the air purification by the gas permeable membrane 41a.

In a case where, for example, an ultrafiltration membrane (UF) is used as the gas permeable membrane 41a, the diameter of the micropores can be set to 10 nm or less. Such setting prevents various extraneous matter including not only viruses, bacteria, and fungi, but also cedar pollen and cypress pollen from passing through the gas permeable membrane 41a. This makes it possible to prevent these extraneous matter from passing through the gas permeable membrane 41a and being mixed into the purified air, which is returned into the room 2.

Figure 5:
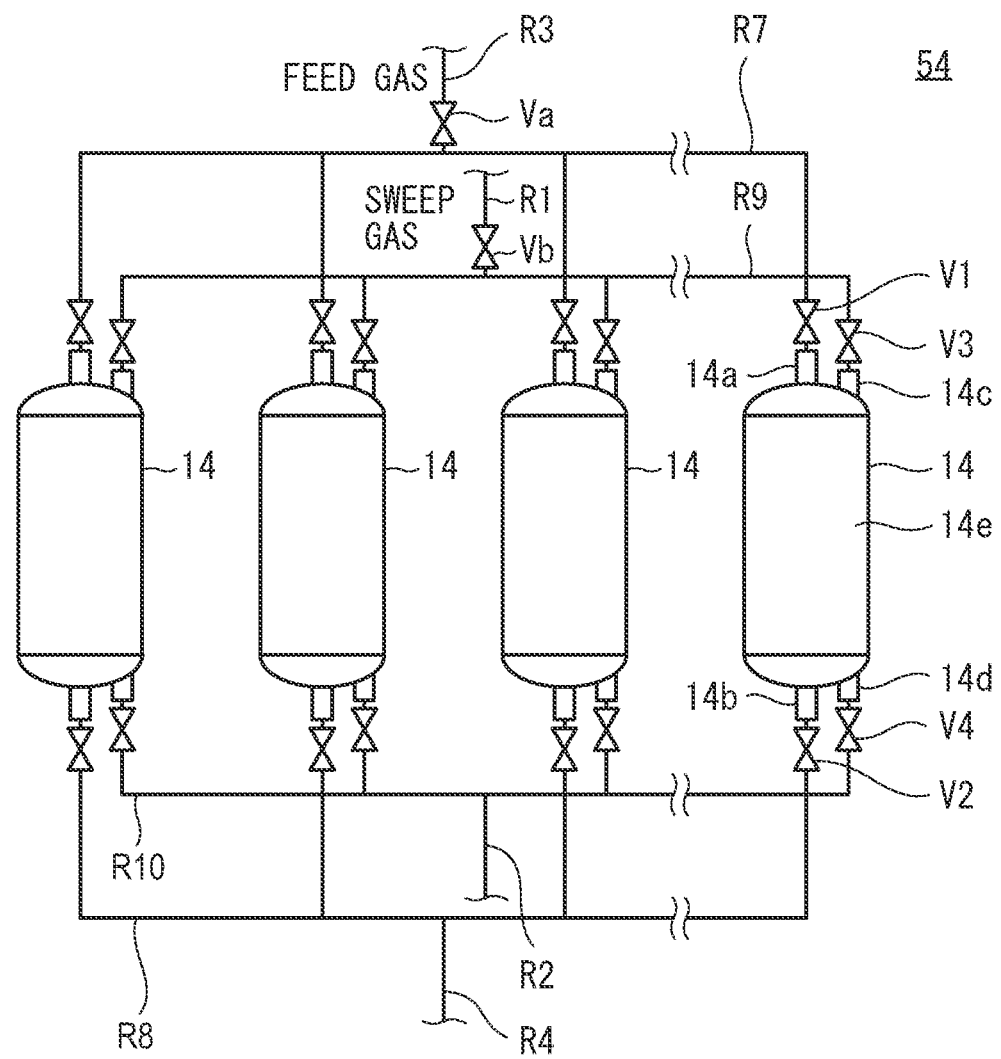
FIG. 5 shows the configuration of part of the air purifying system according to a variation of Embodiment 1.

FIG. 5 shows the configuration of a part of the air purifying system according to a variation of Embodiment 1. As shown in FIG. 5, the system includes first supply piping R7, first discharge piping R8, second supply piping R9, and second discharge piping R10. The adjusting equipment of the system includes a first flow rate adjuster and a second flow rate adjuster. A remover 54 includes membrane modules 14.

The first supply piping R7 connects the first introduction ports 14a of the respective membrane modules 14 to each other, and supplies the feed gas to the first introduction ports 14a collectively. The first discharge piping R8 connects the first discharge ports 14b of the membrane modules 14 to each other, and supplies the purified air discharged through the first discharge ports 14b to the return passage R4 collectively.

The second supply piping R9 connects the second introduction ports 14c of the respective membrane modules 14 to each other, and supplies the sweep gas to the second introduction ports 14c collectively. The second discharge piping R10 connects the second discharge ports 14d of the membrane modules 14 to each other, and supplies the mixed gas discharged through the second discharge ports 14d to the discharge passage R2 collectively.

A gas pressure loss occurs in each of passages extending from a valve Va of the first supply piping R7 to valves V1 corresponding to the respective membrane modules 14, and differences in gas pressure loss among the passages are suppressed to fall within the range of a few percent or less. Similarly, a gas pressure loss occurs in each of passages extending from a valve Vb of the second supply piping R9 to valves V2 corresponding to the respective membrane modules 14, and differences in gas pressure loss among the passages are suppressed to fall within the range of a few percent or less.

The first flow rate adjuster adjusts the flow rate of the first supply piping R7. The second flow rate adjuster adjusts the flow rate of the second supply piping R9. In the present variation, the first flow rate adjuster is the valve Va, and the second flow rate adjuster is the valve Vb.

In the present variation, before the system starts to be driven, adjustments of valves V1 and V2 are made at a rated flow rate for each membrane module 14, such that a pressure loss in the feed gas passage including the valves V1 and V2 is the same for each membrane module 14, and such that the average gas pressures P1 and P2 are substantially equal to each other in each membrane module 14.

Next, adjustments of valves V3 and V4 are made at a rated flow rate for each membrane module 14, such that a pressure loss in the sweep gas passage including the valves V3 and V4 is the same for each membrane module 14, and such that the average gas pressures P1 and P2 are substantially equal to each other in each membrane module 14.

By making these adjustments, thereafter, even when the flow rate of the feed gas and the flow rate of the sweep gas that are supplied to each membrane module 14 are changed by the first and second flow rate adjusters, the average gas pressures P1 and P2 are maintained to be substantially equal to each other in each membrane module 14.

That is, according to the above configuration, for example, in a state where the gas pressure in the first space S1 and the gas pressure in the second space S2 in each membrane module 14 are adjusted to be substantially equal to each other by the first-space-dedicated valve and the second-space-dedicated valve, the flow rate of the first supply piping R7 is adjusted by the first flow rate adjuster, and the flow rate of the second supply piping R9 is adjusted by the second flow rate adjuster. This makes it possible to adjust the flow rate of the to-be-purified air (the feed gas) and the flow rate of the sweep gas that are introduced into each membrane module 14, while maintaining the gas pressure in the first space S1 and the gas pressure in the second space S2 in each membrane module 14. Therefore, labor hours to adjust the gas pressure in the first space S1 and the gas pressure in the second space S2 in each membrane module 14 in accordance with changes made to the flow rates can be eliminated, and the air purifying system can be operated much more easily.

The first and second flow rate adjusters are not limited to valves, but may be, for example, inverter circuits of air feeders. In this case, the flow rates can be adjusted by changing the frequencies of the inverter circuits. In the present variation, an orifice having a pre-adjusted flow rate may be used as at least one of the valves V1 to V4. The functions of the first-space-dedicated and second-space-dedicated adjusters may be partly or entirely realized by the first and second flow rate adjusters. Hereinafter, Embodiment 2 is described focusing on differences from Embodiment 1.

Embodiment 2

Figure 6:
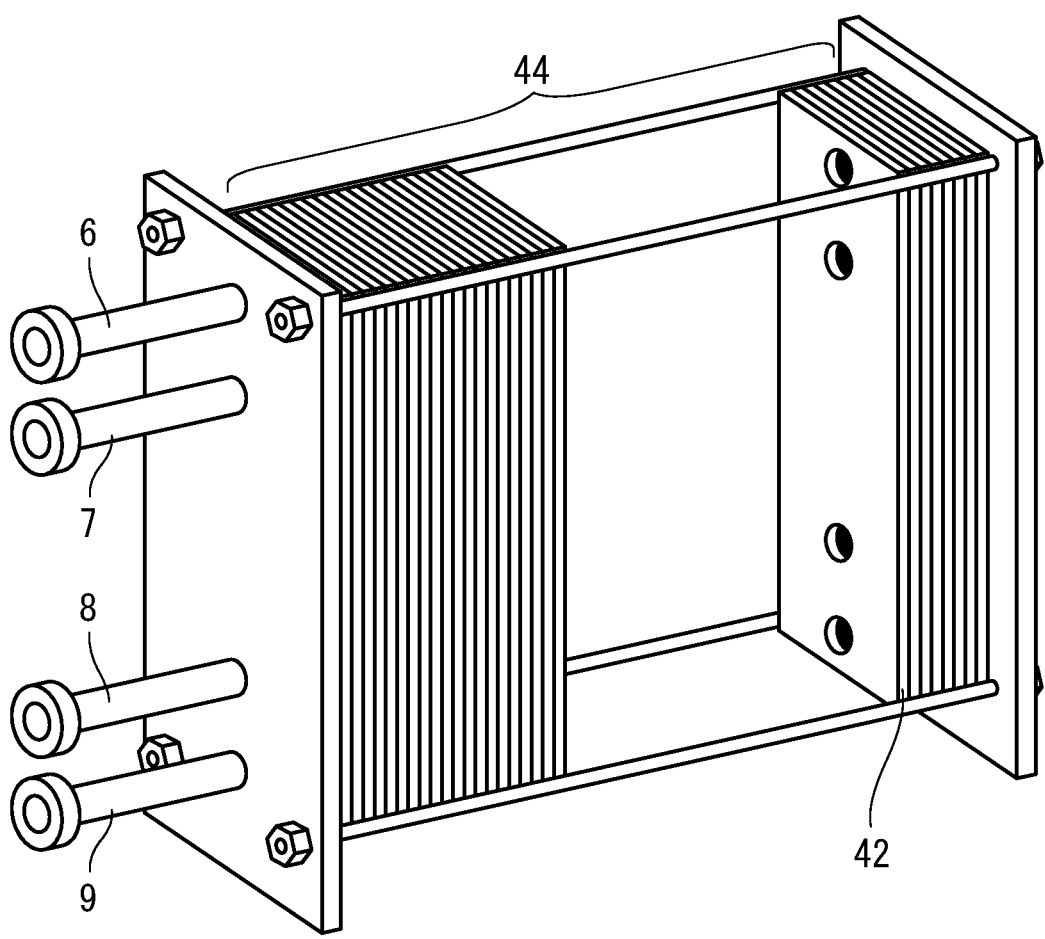
FIG. 6 shows an external view of a carbon dioxide remover according to Embodiment 2 of the present disclosure.
Figure 7:
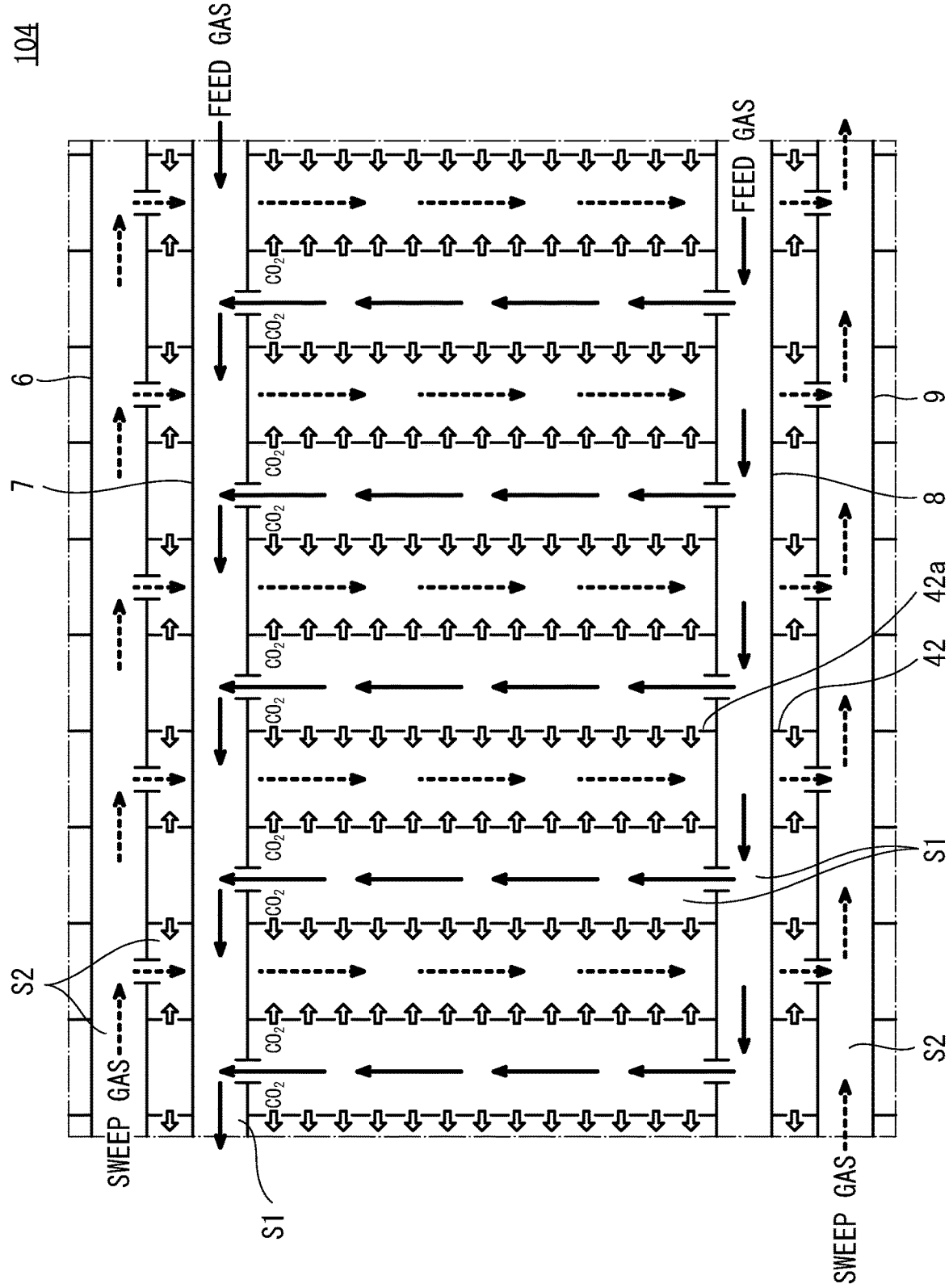
FIG. 7 is a sectional view of the carbon dioxide remover of FIG. 6.

FIG. 6 is an external view of a remover 104 according to Embodiment 2 of the present disclosure. FIG. 7 is a sectional view of the remover 104 of FIG. 6. As shown in FIGS. 6 and 7, the remover 104 includes a laminated membrane module 44, which includes sheet-shaped gas permeable membranes 42.

Specifically, the remover 104 includes the gas permeable membranes 42, which are arranged at intervals in their thickness direction. Micropores 42a are formed in each gas permeable membrane 42, such that the micropores 42a are dispersedly arranged on the surfaces of each gas permeable membrane 42. As one example, the gas permeable membranes 42 are each disposed such that the surfaces thereof extend vertically.

The first space S1 is disposed between each gas permeable membrane 42 and another gas permeable membrane 42 adjacent thereto on one side in the thickness direction. The second space S2 is disposed between each gas permeable membrane 42 and another gas permeable membrane 42 adjacent thereto on the other side in the thickness direction.

Multiple types of piping (supply piping 6, return piping 7, feed piping 8, and discharge piping 9) are provided on the side of the remover 104 in a manner to penetrate through the gas permeable membranes 42.

The supply piping 6 is connected to the downstream end of the supply passage R1. The sweep gas flows through the supply piping 6 to be supplied to the second space S2. The discharge piping 9 is connected to the upstream end of the discharge passage R2. The mixed gas flows through the discharge piping 9 to be discharged to the discharge passage R2. The feed piping 8 is connected to the downstream end of the feed passage R3. The feed gas flows through the feed piping 8 to be supplied to the first space S1.

The return piping 7 is connected to the upstream end of the return passage R4. As a result of the feed gas flowing through the first space S1, carbon dioxide is removed from the feed gas and oxygen is contained in the feed gas, and thus purified air is obtained. The purified air flows through the return piping 7 to return into the room 2.

In the example shown in FIG. 7, the feed gas flows upward along a surface of each gas permeable membrane 42. The sweep gas flows downward along a surface of each gas permeable membrane 42.

In a state where the gas pressure in the first space S1 and the gas pressure in the second space S2 are adjusted to be substantially equal to each other, carbon dioxide molecules in the feed gas move toward the sweep gas through the micropores 42a, and oxygen molecules in the sweep gas move toward the feed gas through the micropores 42a.

The air purifying system of Embodiment 2 including the remover 104 thus configured provides the same advantageous effects as those provided by Embodiment 1. According to the remover 104, by arranging the sheet-shaped gas permeable membranes 42 such that they are laminated at intervals (i.e., such that the first and second spaces S1 and S2 are formed therebetween), the membrane surface area of the gas permeable membranes 42 can be increased while suppressing an increase in the size of the remover 104. This makes it possible to more readily prevent an increase in the size of the air purifying system, and improve the efficiency of the air purification by the gas permeable membranes 42.

The present disclosure is not limited to the above-described embodiments. Modifications, additions, and/or deletions can be made to the above-described configurations without departing from the scope of the present disclosure. The above-described embodiments may be combined with each other in any manner. For example, part of a configuration or method described in one embodiment may be applied to another embodiment. The controller of the air purifying system is not essential. For example, an operator may control the first-space-dedicated valve and the second-space-dedicated valve individually. An adjuster that adjusts the flow rate and the gas pressure in a passage by an inverter circuit of an air feeder may be used instead of either one of the first-space-dedicated valve or the second-space-dedicated valve.

The invention claimed is:

1. An air purifying system comprising:
a carbon dioxide remover including a first space and a second space that are partitioned from each other by at least one gas permeable membrane that includes micropores whose diameter is 50 nm or less;
a feed passage that leads to-be-purified air from inside of a room to the first space;
a supply passage that supplies clean gas that has a lower carbon dioxide concentration and a higher oxygen concentration than the to-be-purified air to the second space;
a discharge passage that discharges, from the second space, mixed gas that is a mixture of the clean gas and carbon dioxide that has permeated through the gas permeable membrane from the first space;
a return passage that leads purified air from the first space into the room, the purified air resulting from removing carbon dioxide from the to-be-purified air; and
adjusting equipment that adjusts a gas pressure in the first space and a gas pressure in the second space to be substantially equal to each other, wherein
the to-be-purified air flows in the first space along a surface of the gas permeable membrane, and the clean gas flows in the second space along a surface of the gas permeable membrane,
the carbon dioxide remover includes at least one membrane module, the membrane module including the first space, the second space, and the gas permeable membrane,
the membrane module includes:
a first introduction port, through which the to-be-purified air is introduced into the first space;
a first discharge port, through which the purified air is discharged from the first space;
a second introduction port, through which the clean gas is introduced into the second space; and
a second discharge port, through which the mixed gas is discharged from the second space, the adjusting equipment includes:
   at least one first-space-dedicated adjuster that adjusts a flow rate and a gas pressure in a passage in the membrane module, the passage connecting between the first introduction port and the first discharge port;
   at least one second-space-dedicated adjuster that adjusts a flow rate and a gas pressure in a passage in the membrane module, the passage connecting between the second introduction port and the second discharge port; and
   a controller that controls the first-space-dedicated adjuster and the second-space-dedicated adjuster individually,
either the first-space-dedicated adjuster includes a first valve and a second valve, or the second-space-dedicated adjuster includes a third valve and a fourth valve,
the first valve is positioned upstream of the first space and communicates with the first introduction port,
the second valve is positioned downstream of the first space and communicates with the first discharge port,
the third valve is positioned upstream of the second space and communicates with the second introduction port,
the fourth valve is positioned downstream of the second space and communicates with the second discharge port, and
either (i) the gas pressure in the first space and the gas pressure in the second space are adjusted to be substantially equal to each other by adjusting an opening degree of each of the first valve and the second valve individually or (ii) the gas pressure in the first space and the gas pressure in the second space are adjusted to be substantially equal to each other by adjusting an opening degree of each of the third valve and the fourth valve individually.

2. The air purifying system according to claim 1, wherein the first-space-dedicated adjuster adjusts the gas pressure in the first space to be substantially equal to the gas pressure in the second space while securing a necessary supply amount of the to-be-purified air for removing a predetermined amount of carbon dioxide from the to-be-purified air.

3. The air purifying system according to claim 1, wherein the at least one membrane module comprises membrane modules,
the air purifying system further comprises:
   first supply piping that connects the first introduction ports of the respective membrane modules to each other and that supplies the to-be-purified air to the first introduction ports collectively; and
   second supply piping that connects the second introduction ports of the respective membrane modules to each other and that supplies the clean gas to the second introduction ports collectively, and
the adjusting equipment further includes:
   a first flow rate adjuster that adjusts a flow rate of the first supply piping; and
   a second flow rate adjuster that adjusts a flow rate of the second supply piping.

4. The air purifying system according to claim 1, wherein the gas permeable membrane is an ultrafiltration membrane.

5. The air purifying system according to claim 1, wherein the gas permeable membrane is a hollow fiber membrane,
the first space is disposed inside a hollow fiber included in the hollow fiber membrane, and
the second space is disposed outside the hollow fiber.

6. The air purifying system according to claim 1, further comprising an air feeder that is provided on a non-end portion of the feed passage.

7. The air purifying system according to claim 1, wherein the at least one gas permeable membrane included in the carbon dioxide remover comprises sheet-shaped gas permeable membranes,
the gas permeable membranes are arranged at intervals in a thickness direction of the gas permeable membranes,
the first space is disposed between each one of the gas permeable membranes and another one of the gas permeable membranes adjacent thereto on one side in the thickness direction, and
the second space is disposed between each one of the gas permeable membranes and another one of the gas permeable membranes adjacent thereto on the other side in the thickness direction.

8. The air purifying system according to claim 1, wherein the first-space-dedicated adjuster includes:
   the first valve; and
   the second valve, and
the second-space-dedicated adjuster includes:
   the third valve; and
   the fourth valve.

9. An air purifying system comprising:
a carbon dioxide remover including a first space and a second space that are partitioned from each other by at least one gas permeable membrane that includes micropores whose diameter is 50 nm or less;
a feed passage that leads to-be-purified air from inside of a room to the first space;
a supply passage that supplies clean gas that has a lower carbon dioxide concentration and a higher oxygen concentration than the to-be-purified air to the second space;
a discharge passage that discharges, from the second space, mixed gas that is a mixture of the clean gas and carbon dioxide that has permeated through the gas permeable membrane from the first space;
a return passage that leads purified air from the first space into the room, the purified air resulting from removing carbon dioxide from the to-be-purified air; and
adjusting equipment that adjusts a gas pressure in the first space and a gas pressure in the second space to be substantially equal to each other, wherein
the to-be-purified air flows in the first space along a surface of the gas permeable membrane, and the clean gas flows in the second space along a surface of the gas permeable membrane,
the carbon dioxide remover includes at least one membrane module, the membrane module including the first space, the second space, and the gas permeable membrane,
the membrane module includes:
   a first introduction port, through which the to-be-purified air is introduced into the first space;
   a first discharge port, through which the purified air is discharged from the first space;
   a second introduction port, through which the clean gas is introduced into the second space; and
   a second discharge port, through which the mixed gas is discharged from the second space,
the adjusting equipment includes:
   at least one first-space-dedicated adjuster that adjusts a flow rate and a gas pressure in a passage in the membrane module, the passage connecting between the first introduction port and the first discharge port; and
   at least one second-space-dedicated adjuster that adjusts a flow rate and a gas pressure in a passage in the membrane module, the passage connecting between the second introduction port and the second discharge port, the first-space-dedicated adjuster includes:
- a first-space-dedicated first valve positioned upstream of the first space, the first-space-dedicated first valve communicating with the first introduction port; and
- a first-space-dedicated second valve positioned downstream of the first space, the first-space-dedicated second valve communicating with the first discharge port, the second-space-dedicated adjuster includes:
- a second-space-dedicated third valve positioned upstream of the second space, the second-space-dedicated third valve communicating with the second introduction port; and
- a second-space-dedicated fourth valve positioned downstream of the second space, the second-space-dedicated fourth valve communicating with the second discharge port, and the gas pressure in the first space and the gas pressure in the second space are adjusted to be substantially equal to each other by adjusting an opening degree of each of the first-space-dedicated first valve, the first-space-dedicated second valve, the second-space-dedicated third valve, and the second-space-dedicated fourth valve individually.

10. The air purifying system according to claim 9, wherein
the first-space-dedicated adjuster adjusts the gas pressure in the first space to be substantially equal to the gas pressure in the second space while securing a necessary supply amount of the to-be-purified air for removing a predetermined amount of carbon dioxide from the to-be-purified air.

11. The air purifying system according to claim 9, wherein
the at least one membrane module comprises membrane modules,
the air purifying system further comprises:
first supply piping that connects the first introduction ports of the respective membrane modules to each other and that supplies the to-be-purified air to the first introduction ports collectively; and
second supply piping that connects the second introduction ports of the respective membrane modules to each other and that supplies the clean gas to the second introduction ports collectively, and the adjusting equipment further includes:
- a first flow rate adjuster that adjusts a flow rate of the first supply piping; and
- a second flow rate adjuster that adjusts a flow rate of the second supply piping.

12. The air purifying system according to claim 9, wherein the gas permeable membrane is an ultrafiltration membrane.

13. The air purifying system according to claim 9, wherein
the gas permeable membrane is a hollow fiber membrane,
the first space is disposed inside a hollow fiber included in the hollow fiber membrane, and
the second space is disposed outside the hollow fiber.

14. The air purifying system according to claim 9, further comprising an air feeder that is provided on a non-end portion of the feed passage.

15. The air purifying system according to claim 9, wherein
the carbon dioxide remover includes sheet-shaped gas permeable membranes arranged at intervals in a thickness direction of the gas permeable membranes,
the first space is disposed between each one of the gas permeable membranes and another one of the gas permeable membranes adjacent thereto on one side in the thickness direction, and
the second space is disposed between each one of the gas permeable membranes and another one of the gas permeable membranes adjacent thereto on the other side in the thickness direction.

* * * * *